United States Patent
Wu

(10) Patent No.: US 7,337,252 B2
(45) Date of Patent: Feb. 26, 2008

(54) SYSTEM AND METHOD FOR RESOLVING CONFLICTS OF RE-LOCKING RESOURCES

(75) Inventor: Cheng-Meng Wu, Tu-Cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 119 days.

(21) Appl. No.: 11/314,427

(22) Filed: Dec. 20, 2005

(65) Prior Publication Data

US 2006/0136636 A1  Jun. 22, 2006

(30) Foreign Application Priority Data

Dec. 21, 2004  (CN)  .......................... 2004 1 0091815

(51) Int. Cl.
  *G06F 12/00* (2006.01)
  *G06F 17/30* (2006.01)
(52) U.S. Cl. .......................................... 710/200; 707/8
(58) Field of Classification Search ................. 710/200; 707/8
  See application file for complete search history.

(56) References Cited

U.S. PATENT DOCUMENTS

| | | | | |
|---|---|---|---|---|
| 5,669,002 A | * | 9/1997 | Buch | 710/200 |
| 5,968,157 A | * | 10/1999 | Joy et al. | 710/200 |
| 5,987,550 A | * | 11/1999 | Shagam | 710/119 |
| 6,253,273 B1 | * | 6/2001 | Blumenau | 710/200 |
| 6,782,440 B2 | * | 8/2004 | Miller | 710/200 |
| 6,965,893 B1 | * | 11/2005 | Chan et al. | 707/8 |
| 2002/0016879 A1 | * | 2/2002 | Miller | 710/200 |
| 2005/0203903 A1 | | 9/2005 | Rajan et al. | |

* cited by examiner

*Primary Examiner*—Glenn A. Auve
(74) *Attorney, Agent, or Firm*—Morris Manning Martin LLP; Tim Tingkang Xia, Esq.

(57) ABSTRACT

A system for resolving conflicts of re-locking resources includes: a plurality of system resources (10), a memory (11), and a central processing unit (12). The memory includes a data storing region (110), a re-lock resolving module (111), and an application storing region (112) for storing a plurality of function applications. The central processing unit is used for reading data from the memory and executing the re-lock resolving module to resolve conflicts of re-locking resources.

13 Claims, 4 Drawing Sheets

SYSTEM AND METHOD FOR RESOLVING CONFLICTS OF RE-LOCKING RESOURCES

BACKGROUND OF THE INVENTION

1. Field of the Invention

The present invention relates to a system and method for dealing with computer resources, and more particularly to a system and method for resolving conflicts of re-locking resources.

2. General Background

Distributed computer environments, such as computer networks, provide significant advantages to multiple computer clients or users. In particular, distributed environments allow multiple clients to actually share many different computer resources including both hardware and software resources. Sharing software-related resources provides many known benefits, such as the fact that only one such resource needs to be created, updated and maintained, and provides many known disadvantages, such as the fact that if one or more such resources are being used and locked by someone, the resources can not be used while others try to use and re-lock the resources.

Presently, the disadvantage of re-locking software-related resources becomes more and more prominent, and there is still no effective method to resolve the problem. If two or more separate client processes attempt to use the same resources, a potential re-locking situation may occur, where each locks one of the resources but prevents the other(s) from using all the resources. A re-locking situation precludes using success for each of the processes. One solution to this problem involves a server-side utility that monitors using requests and attempts to "remember" whether a using request has been granted to a client process that is now requesting a subsequent resource. Recognizing that a client process is requesting a subsequent resource provides the server the ability to anticipate potential re-locking situations before they occur. Unfortunately, a significant amount of overhead is required to store information related to all previously granted requests for using, and the client that requested the using.

What is needed, therefore, is a system and method for resolving conflicts of re-locking resources, which can anticipate re-locking situations before the re-locking situations occur in a computer, so as to resolve conflicts of re-locking resources of the computer.

SUMMARY

A system for resolving conflicts of re-locking system resources includes: a plurality of system resources, a memory, and a central processing unit. The memory includes a data storing region, a re-lock resolving module, and an application storing region for storing a plurality of function applications. The central processing unit is used for reading data from the memory and executing the re-lock resolving module to resolve conflicts of re-locking resources. The data storing region is used for recording a plurality of data sets that include data on the system resources. The data sets include a first data set, a second data set, and a third data set. The re-lock resolving module includes a locked system resource obtaining sub-module, an exclusive disjunction sub-module, and a system resource locking sub-module. The locked system resource obtaining sub-module is used for obtaining data on the system resources in the first data set and the second data set. The exclusive disjunction sub-module is used for executing exclusive disjunction between the data first set and the second data set, and recording exclusive disjunction results into the third data set. The system resource locking sub-module is used for comparing bits having the value "1" in the third data set with corresponding bits in the first data set, and for locking corresponding system resources according to the results of the comparison.

A computer-based method for resolving conflicts of re-locking system resources includes the steps of: setting a unique identification for each system resource, and setting a corresponding locking function and an unlocking function for each system resource; reading a second data set which includes data on system resources that are needed to execute a function application; reading a first data set which includes data on system resources that are being used by other executing function applications before the function application is executed; executing exclusive disjunction between the second data set and the first data set, and recording results of executing exclusive disjunction between the first data set and the second data set into a third data set; comparing a bit have the value "1" in the third data set with a corresponding bit in the first data set, and determining whether the two bits are equal; locking the system resource corresponding to the two bits if the two bits are not equal; determining whether the system resource corresponding to the two bits has been locked; determining whether all the bits with the value "1" in the third data set have been compared if the system resource corresponding to the two bits has been locked; executing the other executing function applications if all the bits with the value "1" in the third data set have been compared; and unlocking system resources contained in the first data set and executing the function application, if the other executing function applications have been executed completely.

Other advantages and novel features of the present invention will become more apparent from the following detailed description of preferred embodiments when taken in conjunction with the accompanying drawings, in which:

DETAILED DESCRIPTION OF THE INVENTION

Figure 1:
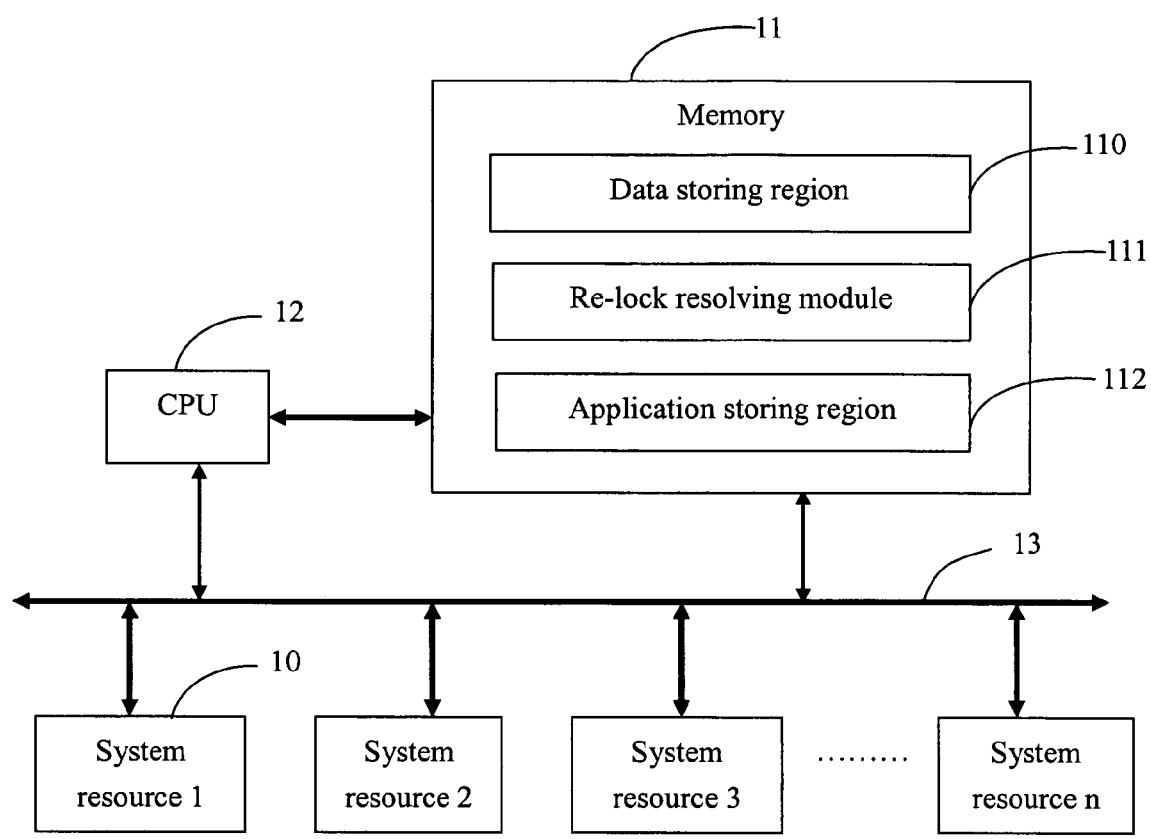
FIG. 1 is a schematic diagram of hardware configuration of a system for resolving conflicts of re-locking resources in accordance with a preferred embodiment of the present invention.

FIG. 1 is a schematic diagram of hardware configuration of a system for resolving conflicts of re-locking resources (hereinafter, "the system") in accordance with a preferred embodiment of the present invention. The system includes a plurality of system resources 10, a memory 11, a CPU (central processing unit) 12, and a system bus 13. Each of the system resources 10 may be a printer, a hard disk, or any other suitable type of hardware device. Each system resource 10 is linked with the memory 11 and the CPU 12 via the system bus 13, and corresponds to a unique identification (ID). The memory 11 includes a data storing region 110, a re-lock resolving module 111, and an application storing region 112 for storing a plurality of function applications. The CPU 12 is also linked with the memory 11 via the system bus 13, for reading data from the memory 11 and executing the re-lock resolving module 111 to perform corresponding functions.

The data storing region 110 is used for recording a plurality of data sets that includes data on system resources 10 needed to execute each function application, Each data set can be denoted by 32 bits like 0000 0000 0000 0000 0000 0000 0000 0000, in which each bit corresponds to a respective system resource 10. When any bit has the value "1" it means the system resource 10 corresponding to the bit is in the data set. The plurality of data sets include a first data set M, a second data set L, and a third data set K. The data set M includes data on system resources 10 that are being used by other executing function applications (for example, the function application 1, the function application 2, and the function application 3 in FIG. 2) before a particular function application (for example, the function application 4 in FIG. 2) is executed. The data set L includes data on all the system resources 10 needed to execute the function application 4. The data set K includes results of executing exclusive disjunction between the data set M and the data set L.

Figure 2:
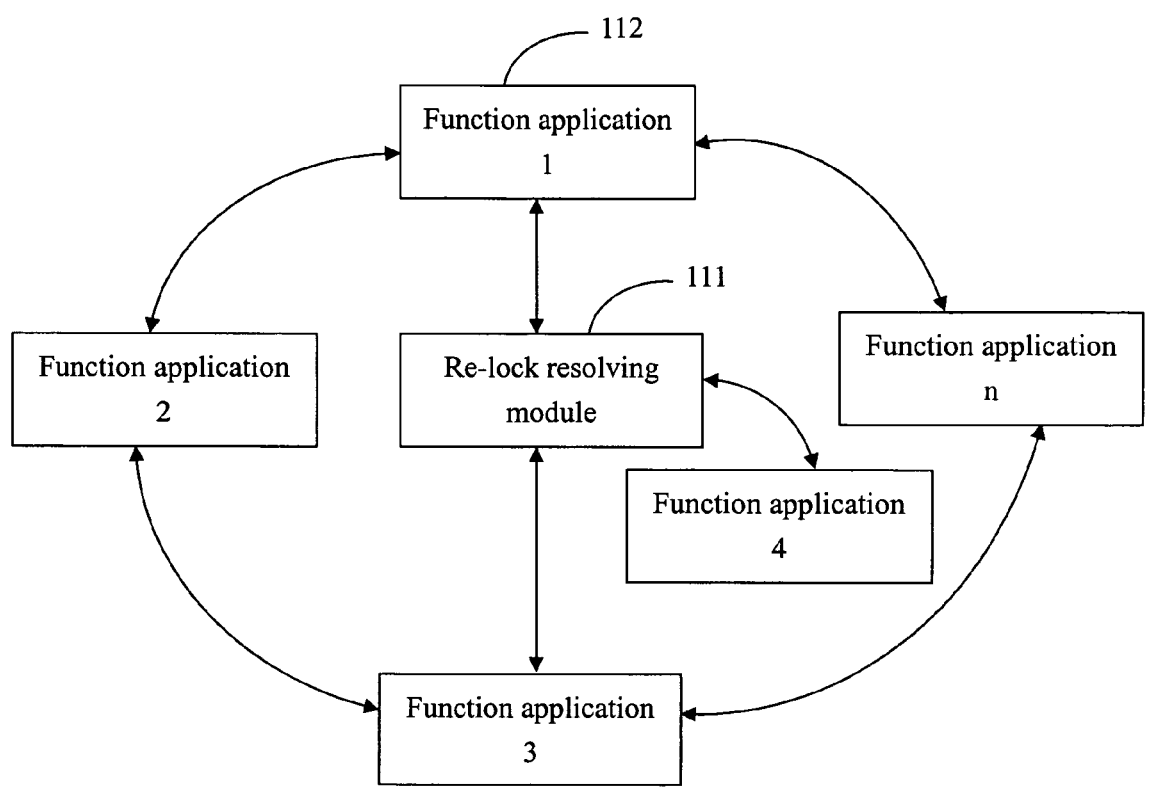
FIG. 2 is an exemplary diagram showing a re-lock resolving module of FIG. 1 as a "bridge" when a plurality of function applications are running at the same time.

FIG. 2 is an exemplary diagram showing the re-lock resolving module 111 as a "bridge" when a plurality of function applications are running at the same time. In this example, the function application 1, function application 2 and function application 3 are being executed, and occupy certain system resources 10. The function application 4 needs to be executed subsequently. The re-lock resolving module 111 determines the system resources 10 being occupied by the function application 1, function application 2 and function application 3, and determines one or more system resources 10 needed to execute the function application 4.

Figure 3:
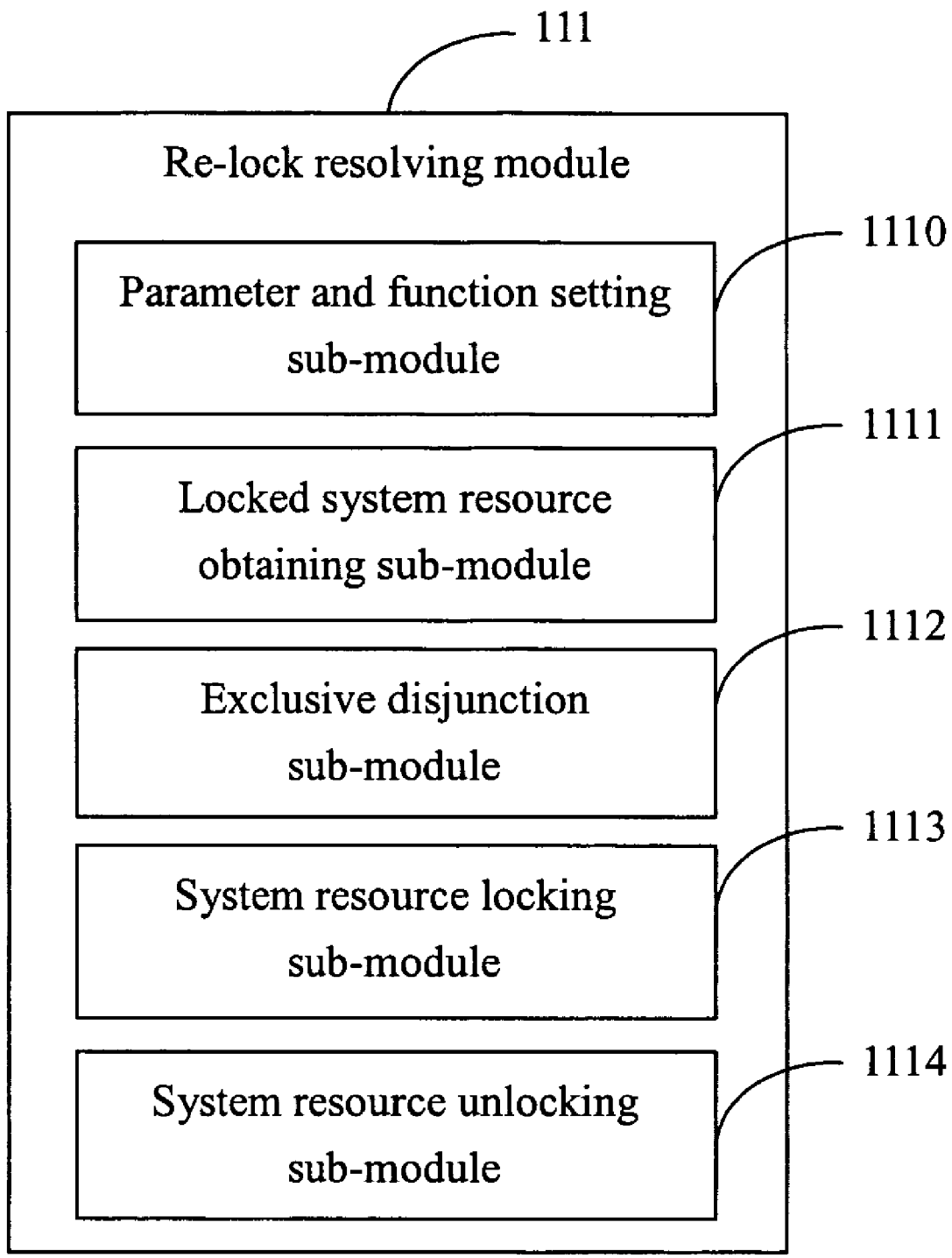
FIG. 3 is a schematic diagram of sub-modules of the re-lock resolving module of FIG. 2.

FIG. 3 is a schematic diagram of sub-modules of the re-lock resolving module 111. The re-lock resolving module 111 includes a parameter and function setting sub-module 1110, a locked system resource obtaining sub-module 1111, an exclusive disjunction sub-module 1112, a system resource locking sub-module 1113, and a system resource unlocking sub-module 1114. The parameter and function setting sub-module 1110 is used for setting a unique ID for each system resource 10, and setting a corresponding locking function and an unlocking function for each system resource 10. The locked system resource obtaining sub-module 1111 is used for obtaining data on system resources 10 in the data set M. The exclusive disjunction sub-module 1112 is used for executing exclusive disjunction between the data set M and the data set L, and recording the results into the data set K. The system resource locking sub-module 1113 is used for obtaining data in the data set K, and comparing bits having the value "1" in the data set K with corresponding bits in the data set M. If a bit in the data set M also has the value "1", it means the corresponding system resource 10 has been locked by other function applications being executed (for example, the function application 1, the function application 2, and the function application 3 in FIG. 2) before executing a function application (for example, the function application 4 in FIG. 2). If a bit in the data set M has the value "0" it means the corresponding system resource 10 has not been locked by the function applications being executed before executing the function application 4, and then the system resource locking sub-module 1113 executes a locking function of the system resource 10 corresponding to the bit. If the system resource locking sub-module 1113 fails to execute the locking function of the system resource 10, that means the system resource 10 has not been locked by the function applications being executed and then the system resource locking sub-module 1113 returns a message of unsuccessful locking. If the system resource locking sub-module 1113 succeeds in executing the locking function of the system resource 10, the corresponding bit in the data set M is set as the value "1", and a message of successful locking is returned. The system resource unlocking sub-module 1114 is used for unlocking the system resources 10 contained in the data set M according to respective unlocking functions, and setting values of the corresponding bits in the data set M as the value "0".

Figure 4:
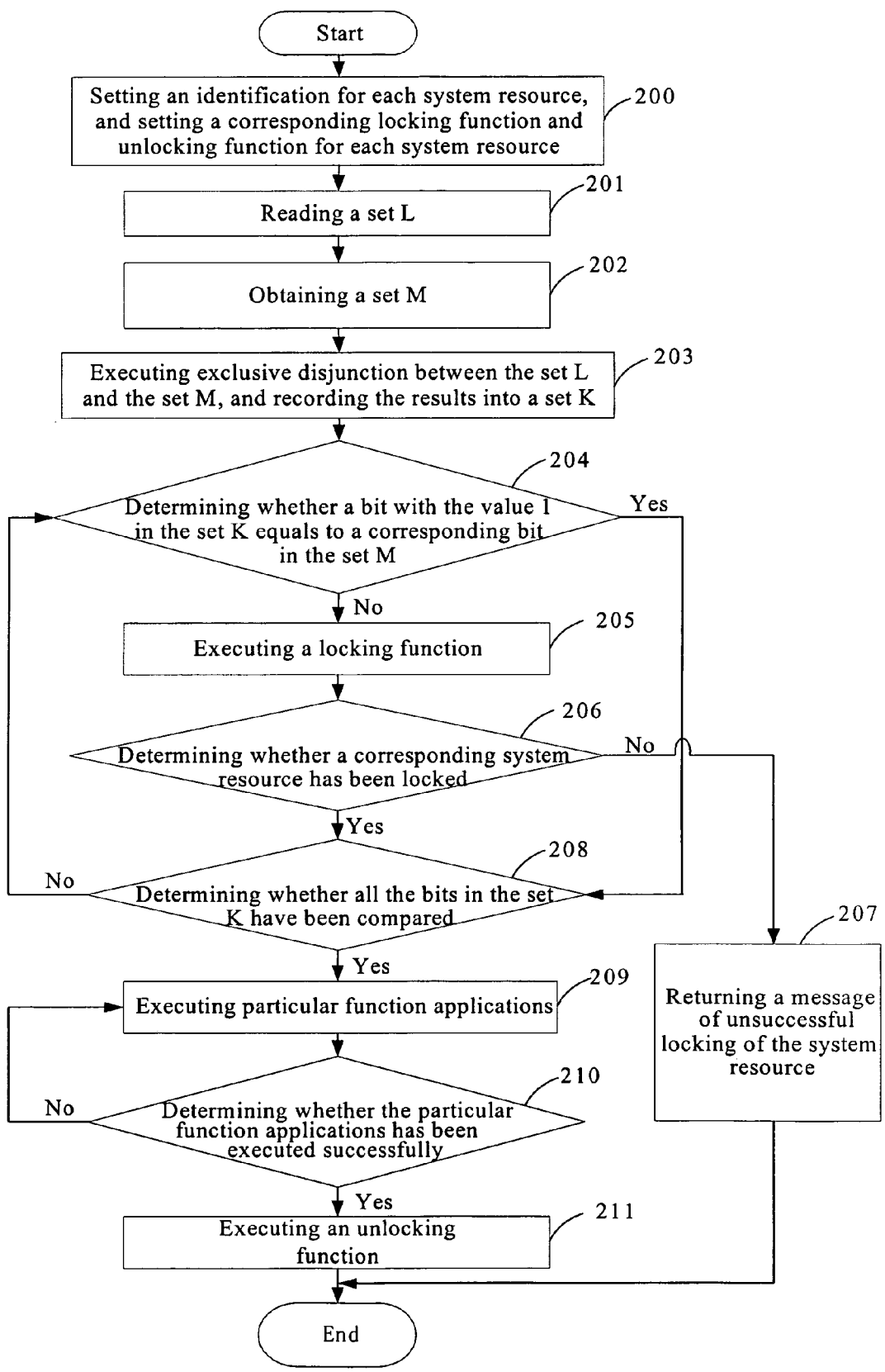
FIG. 4 is a flowchart of a preferred method for resolving conflicts of re-locking resources in accordance with a preferred embodiment of the present invention.

FIG. 4 is a flowchart of a preferred method for resolving conflicts of re-locking resources by utilizing the system of FIG. 1. In step S200, the CPU 12 activates the parameter and function setting sub-module 1110 of the memory 11. The parameter and function setting sub-module 1110 sets a unique ID for each system resource 10, and sets a corresponding locking function and an unlocking function for each system resource 10. In step S201, the CPU 12 reads a data set L, which includes data on the system resources 10 that are needed to execute a function application (for example, the function application 4 in FIG. 2). In step S202, the locked system resource obtaining sub-module 1111 obtains a data set M which includes data on system resources 10 that are being used by other executing function applications (for example, the function application 1, the function application 2, and the function application 3 in FIG. 2) before the function application 4 is executed. In step S203, the CPU 12 activates the exclusive disjunction sub-module 1112 of the memory 11. The exclusive disjunction sub-module 1112 executes exclusive disjunction between the data set M and the data set L, and records the results into the data set K. In step S204, the CPU 12 activates the system resource locking sub-module 1113. The system resource locking sub-module 1113 compares a bit with the value "1" in the data set K with a corresponding bit in the data set M, and determines whether the two bits are equal. If the two bits are equal, the procedure goes directly to step S208 described below. Otherwise, if the two bits are not equal, in step S205, the system resource locking sub-module 1113 executes a locking function of the system resource 10 corresponding to the two bits. In step S206, the system resource locking sub-module 1113 determines whether the system resource 10 has been locked, namely, the system resource locking sub-module 1113 determines whether the bit in the data set M corresponding to the system resource 10 has been set as the value "1". If the system resource 10 has not been locked, in step S207, the system resource locking sub-module 1113 returns a message of unsuccessful locking of the system resource 10, whereupon the procedure ends. If the system resource 10 has been locked, in step S208, the system resource locking sub-module 1113 determines whether all the bits with the value "1" in the data set K have been compared with respective bits in the data set M. If any bit in the data set K has not been compared with a corresponding bit in the data set M, the procedure goes back to step S204 described above. Otherwise, if all the bits in the data set K have been compared, in step S209, the CPU 12 executes the function application 1, the function application 2 and the function application 3. In step S210, the CPU 12 determines whether the function applications executed by the CPU 12 have been executed successfully. If the function applications have not been executed successfully, the procedure goes back to step S209 described above. Otherwise, if the function applications have been executed successfully, in step S211, the CPU 12 activates the system resource unlocking sub-module 1114 of the memory 11. The system resource unlocking sub-module 1114 unlocks the system resources 10 contained in the data set M, and sets the corresponding bits in the data set M as the value "0".

Although the present invention has been specifically described on the basis of a preferred embodiment and a preferred method, the invention is not to be construed as being limited thereto. Various changes or modifications may be made to said embodiment and method without departing from the scope and spirit of the invention.

We claim:

1. A system for resolving conflicts of re-locking system resources, the system comprising:
    a plurality of system resources;
    a memory comprising:
    a data storing region for recording a plurality of data sets that comprise data on the system resources, wherein the data sets comprise a first data set, a second data set and a third data set;
    a re-lock resolving module for resolving conflicts of re-locking resources, the re-lock resolving module comprising:
    a locked system resource obtaining sub-module for obtaining data on the system resources in the first data set and the second data set;
    an exclusive disjunction sub-module for executing exclusive disjunction between the data first set and the second data set, and recording exclusive disjunction results into the third data set; and
    a system resource locking sub-module for comparing bits having the value "1" in the third data set with corresponding bits in the first data set, and locking corresponding system resources according to the results of the comparison;
    an application storing region for storing a plurality of function applications; and
    a central processing unit for reading data from the memory and executing the re-lock resolving module to resolve conflicts of re-locking resources.

2. The system as claimed in claim 1, wherein each of the system resources corresponds to a unique identification.

3. The system as claimed in claim 1, wherein
    the first data set comprises data on the system resources that are being used by other executing function applications before a particular function application is executed; and
    the second data set comprises data on all the system resources that are needed to execute the particular function application.

4. The system as claimed in claim 1, wherein the re-lock resolving module further comprises:
    a parameter and function setting sub-module for setting a unique identification for each system resource, and setting a corresponding locking function and an unlocking function for each system resource; and
    a system resource unlocking sub-module for unlocking the system resources contained in the first data set if the other executing function applications have been executed completely.

5. The system as claimed in claim 1, wherein each of the data sets is denoted by 32 bits, and each of the bits corresponds to a respective system resource.

6. A computer-based method for resolving conflicts of re-locking system resources, the method comprising the steps of:
    setting a unique identification for each system resource, and setting a corresponding locking function and an unlocking function for each system resource;
    reading a second data set which comprises data on system resources that are needed to execute a function application;
    reading a first data set which comprises data on system resources that are being used by other executing function applications before the function application is executed;
    executing exclusive disjunction between the second data set and the first data set, and recording results of executing exclusive disjunction between the first data set and the second data set into a third data set;
    comparing a bit having the value "1" in the third data set with a corresponding bit in the first data set, and determining whether the two bits are equal;
    locking the system resource corresponding to the two bits if the two bits are not equal;
    determining whether the system resource corresponding to the two bits has been locked;
    determining whether all the bits with the value "1" in the third data set have been compared, if the system resource corresponding to the two bits has been locked; and
    executing the other executing function applications if all the bits with the value "1" in the third data set have been compared.

7. The method according to claim 6, wherein the step of determining whether the two bits are equal comprises the step of going directly to the step of determining whether all the bits with the value "1" in the third data set have been compared, if the two bits are equal.

8. The method according to claim 6, wherein the step of determining whether the system resource corresponding to the two bits has been locked comprises the step of returning a message of unsuccessful locking of the system resource, if the system resource corresponding to the two bits has not been locked.

9. The method according to claim 6, wherein the step of determining whether all the bits with the value "1" in the third data set have been compared comprises the step of going back to the step of comparing a bit with the value "1" in the third data set with a corresponding bit in the first data set, if any bit with the value "1" in the third data set has not been compared.

10. The method according to claim 6, further comprising the step of unlocking system resources contained in the first data set and executing the function application, if the other executing function applications have been executed completely.

11. A method for resolving conflicts of re-locking system resources of a system, comprising the steps of:
    retrieving information of system resources that are capable of being locked for executing a plurality of function applications in said system;
    identifying a first data set that comprise data on system resources that are being locked for use by currently-executing function applications out of said plurality of function applications based on said retrieved information;
    identifying a second data set that comprise data on system resources that are needed by a to-be-executed function application out of said plurality of function applications;
    removing a request of locking one of said needed system resources for said to-be-executed function application when said one of said needed system resources is identified as being locked for use by said currently-executing function applications; and locking said one of said needed system resources when said one of said needed system resources is identified as being unlocked by said currently-executing function applications.

12. The method according to claim 11, wherein and each bit of said first data set corresponds to a respective one of said system resources, and each bit of said second data set corresponds to a respective one of said system resources.

13. The method according to claim 11, wherein an exclusive disjunction calculation is executed between said first data set and said second data set in said removing step.

* * * * *